United States Patent
Cruz Serna et al.

(10) Patent No.: US 11,457,645 B2
(45) Date of Patent: Oct. 4, 2022

(54) FAT COMPOSITION

(71) Applicants: Adriana Cruz Serna, Bogota (CO); Claudia Guzman Corona, Morelia (MX)

(72) Inventors: Adriana Cruz Serna, Bogota (CO); Claudia Guzman Corona, Morelia (MX)

(73) Assignee: Team Foods Colombia S.A., Bogota (CO)

(*) Notice: Subject to any disclaimer, the term of this patent is extended or adjusted under 35 U.S.C. 154(b) by 1978 days.

(21) Appl. No.: 14/432,366

(22) PCT Filed: Oct. 2, 2012

(86) PCT No.: PCT/IB2012/001952
§ 371 (c)(1),
(2) Date: Mar. 30, 2015

(87) PCT Pub. No.: WO2014/053870
PCT Pub. Date: Apr. 10, 2014

(65) Prior Publication Data
US 2015/0272153 A1    Oct. 1, 2015

(51) Int. Cl.
*A23D 9/00* (2006.01)
*A21D 2/16* (2006.01)
*A23L 9/20* (2016.01)
*A23P 30/40* (2016.01)

(52) U.S. Cl.
CPC .............. *A23D 9/00* (2013.01); *A21D 2/16* (2013.01); *A23L 9/20* (2016.08); *A23P 30/40* (2016.08)

(58) Field of Classification Search
CPC .. A23D 9/00; A23P 30/40; A23L 9/20; A21D 2/16
See application file for complete search history.

(56) References Cited

U.S. PATENT DOCUMENTS

| | | | |
|---|---|---|---|
| 4,360,535 A | 11/1982 | Darling et al. | |
| 5,932,275 A * | 8/1999 | Nalur | A23D 9/00 426/607 |
| 6,210,739 B1 * | 4/2001 | Nalur | A23D 9/00 426/601 |
| 2002/0081367 A1 | 6/2002 | Triantafyllow | |
| 2008/0131576 A1 | 6/2008 | Perks et al. | |
| 2011/0287147 A1 | 11/2011 | Pannel et al. | |

OTHER PUBLICATIONS

Haumann, "Fat Modification—Interesterification Hydrogenation". Inform, vol. 5, No. 6, pp. 668-678. (Year: 1994).*
"Dietary Fats: Balancing Helath & Flavor". Available online at https://foodinsight.org/dietary-fats-balancing-health-flavor/ on Nov. 4, 2013 (Year: 2013).*
International Search Report for PCT Application No. PCT/IB2012/001952, dated Jul. 10, 2013.

* cited by examiner

*Primary Examiner* — Erik Kashnikow
*Assistant Examiner* — Assaf Zilbering
(74) *Attorney, Agent, or Firm* — Greenberg Traurig, LLP

(57) ABSTRACT

The present invention includes a fat composition that contains a first refined and interesterified oil mixture and a second refined and interesterified oil mixture usable in the preparation of non-dairy food products, such as whipped food products, and syrups used for the preparation of food products, such as breads, cakes, gelatins, and custards.

7 Claims, 1 Drawing Sheet

FAT COMPOSITION

RELATED APPLICATIONS

This application is a national phase filing under 35 U.S.C. 371 of PCT International Application No. PCT/IB2012/001952, filed Oct. 2, 2012, the entirety of the application is hereby incorporated herein by reference for the teachings therein.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates to a fat composition, and more particularly, to a fat composition for the preparation of non-dairy whipping food products and syrups used in the preparation of breads, cakes, and other food products.

2. Description of the Related Art

Edible products, such as non-dairy whipping food products, and syrups used in the preparation of breads, gelatins, and custards, commonly use a lipid base or fat composition in their preparation. Often, the lipid base used determines the functional characteristics of the final food product, such as moisture, air incorporation, support, and stability. With the rising popularity of healthy food options, there is an emerging demand for food products with a lower saturated fat content, and thus, there is a demand for lipid bases with reduced saturated fatty acid content that nonetheless display desired functional characteristics in the final food product.

SUMMARY OF THE INVENTION

Additional goals and advantages of the present invention will become more evident in the description of the figures, the detailed description of the invention, and the claims.

The foregoing and/or other aspects and utilities of the present invention may be achieved by providing a fat composition including a first refined and interesterified oil mixture, and a second refined and interesterified oil mixture, wherein the first refined and interesterified oil mixture comprises palm oil or its fractions, palm kernel oil or its fractions, and coconut oil or its fractions, wherein the second refined and interesterified oil mixture oil comprises hydrogenated palm oil or its fractions, hydrogenated palm kernel oil or its fractions, and hydrogenated coconut oil or its fractions, and wherein a weight ratio between the first interesterified and the second interesterified is between 2 and 9.

In another embodiment, based on a total fatty acid content of the first refined and interesterified oil mixture, the first refined and interesterified oil mixture includes between 4% and 18% of lauric acid, between 1% and 6% of miristic acid, between 32% and 50% of palmitic acid, and between 3% and 8% of stearic acid, based on a total fatty acid content of the second refined and interesterified oil mixture, the second refined and interesterified oil mixture includes between 18% and 35% of lauric acid, between 6% and 14% of miristic acid, between 15% and 26% of palmitic acid, between 26% and 40% of stearic acid, and the fat composition includes between 70% and 90% of the first refined and interesterified oil mixture oil, and between 10% and 30% of the second refined and interesterified oil mixture, based on a total weight of the fat composition.

In another embodiment, based on a total fatty acid content of the fat composition, the fat composition includes between 7% and 17% lauric acid, between 27% and 47% palmitic acid, between 5% and 15% stearic acid, and wherein a solid fat content of the fat composition is between 64% and 84% at 10° C., between 41% and 61% at 20° C., between 14% and 35% at 30° C., between 8% and 20% at 35° C., and 10% or less at 40° C.

In another embodiment, a total trans fatty acid content is less than 1%, and a total amount of saturated fatty acids is between 62% and 72%, based on the total fatty acid content of the fat composition.

In another embodiment, when the fat composition is tested as a lipid base used to prepare a whipped food product in accordance to the Whipped Food Product Test Method, an over run characteristic of the whipped food product is at least 8% more than when a whipped food product is prepared with hydrogenated palm kernel oil as lipid base alone in accordance to the Whipped Food Product Test Method.

In another embodiment, the ratio of the first refined and interesterified oil mixture to the second refined and interesterified oil mixture in the fat composition is determined by an increase from 8 to 30% in over-run when the fat composition is tested in accordance to the Whipped Food Product Test Method.

In another embodiment, when the fat composition is tested as a lipid base used to prepare a syrup in accordance to the Bread/Cake Test Method, a retention of the syrup in a food product is at least 5% more than the retention of a syrup in a food product when a syrup is prepared with hydrogenated palm kernel oil as the lipid base in accordance to the Bread/Cake Test Method.

In another embodiment, when the fat composition is tested as a lipid base used to prepare a whipped food product in accordance to the Whipped Food Product Test Method, the ratio of the first refined and interesterified oil mixture to the second refined and interesterified oil mixture in the fat composition is determined by an increase from 5 to 15% in the retention of the syrup when the fat composition is tested in accordance to the Bread/Cake Test Method.

DETAILED DESCRIPTION OF THE EMBODIMENTS

Figure 1:
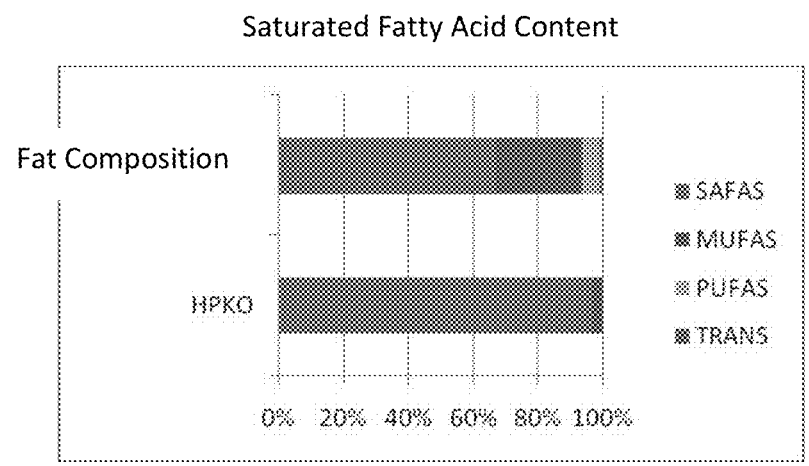
FIG. 1 is a graph showing the saturated fatty acid content of hydrogenated palm kernel oil and a fat composition according to embodiment of the present invention.
Figure 2:
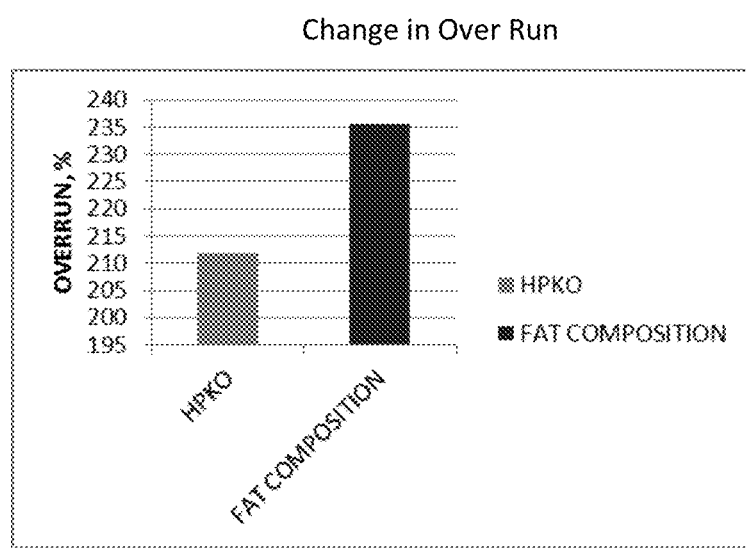
FIG. 2 is a graph showing the change in over run of hydrogenated palm kernel oil and a fat composition according to embodiments of the present invention.

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in one embodiment" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In one embodiment of the present invention, a fat composition provides a lipid base for non-dairy whipping food products with superior "over run" and stability characteristics when compared to non-dairy whipping food products using hydrogenated vegetable oils, such as hydrogenated coconut or hydrogenated palm kernel oil, as the lipid base. In another embodiment, a non-dairy whipping food product using the fat composition as a lipid base has a lower level of saturated fatty acid content when compared to non-dairy whipping food products using hydrogenated vegetable oils, such as hydrogenated coconut or hydrogenated palm kernel oil, as the lipid base.

In other embodiments, when used as a base for non-dairy products, a fat composition according to the present invention improves the incorporation of air into the non-dairy product while resulting in a reduction of the total saturated fatty acid content.

In another embodiment, a fat composition according to the present invention increases the retention of a syrup in a food product when the syrup uses the fat composition as a lipid base when compared to the retention of a syrup in a food product when the syrup uses a hydrogenated vegetable oil, such as hydrogenated coconut or palm kernel oil, as the lipid based. For example, the fat composition is used as the lipid base of a "tres leches" syrup used to prepare a cake food product. In one embodiment of the invention, a greater amount of the "tres leches" syrup using the fat composition as the lipid base was retained when compared to the retention of a "tres leches" syrup using hydrogenated palm kernel oil as the lipid.

In another embodiment, the fat composition may be used in the preparation of custards and gelatins. For example, when a fat composition according to embodiment of the present invention is used to produce a gelatin, the gelatin displayed a smooth and firm texture. Similarly, in another embodiment, when a syrup comprising the fat composition is mixed with egg to create a custard, the custard displayed a smooth and firm texture after being baked or steamed.

In one embodiment of the invention, the fat composition does not include partially hydrogenated oils. In another embodiment, a content of trans-fat fatty acids in the fat composition is low enough to be considered as a trans-fat free product under the U.S. Food and Drug Administration's ("FDA") Definitions of Nutrient Content Claims. In one example, the fat composition has 0.5 grams or less trans-fats per 100 grams of fat composition. In another example of the present invention, a trans-fatty acid content of the fat composition is 2% or less based on a total amount of fatty acids in the fat composition.

In one embodiment of the present invention, the fat composition includes an interesterified mixture of two base oils.

In one embodiment, a base oil is a mixture of oils. For example, a base oil may include at least one of hydrogenated or non-hydrogenated palm oil, hydrogenated or non-hydrogenated palm kernel oil, and palm stearin. For example, as illustrated in Table 1, the fat composition may include between 70%-90% of a first interesterified base oil and between 10%-30% of a second interesterified base oil, based on a total weight of the fat composition.

TABLE 1

| Base Oils of the Fat Composition | Proportion % |
|---|---|
| First Interesterified Base Oil | 70-90 |
| Second Interesterified Base Oil | 10-30 |

As illustrated in Table 2, in one embodiment, based on a total weight of the first interesterified base oil, the first interesterified base oil includes an oil mixture of between 28%-58% palm stearin, between 20%-40% palm oil, and between 12-32% palm kernel oil. In another embodiment, based on a total weight of the second interesterified base oil, the second interesterified base oil includes a fully hydrogenated oil mixture of between 30%-50% palm oil and between 50-70% palm kernel oil.

TABLE 2

| Component Oils | First Interesterified Base Oil | Second Interesterified Base Oil |
|---|---|---|
| Palm Stearin V.I. 30-49 | 28-58% | 0.0% |
| Palm oil | 20-40% | 30-50% |
| Palm Kernel oil | 12-32% | 50-70% |

In another embodiment, the fat composition has a specific balance of lauric, palmitic, and stearic acids, and specific physicochemical parameters. For example, in one embodiment, the fat composition has the physicochemical parameters and lipid composition illustrated in Table 3.

TABLE 3

| Parameter | | % |
|---|---|---|
| Lauric Acid | | 7-17% |
| Palmitic Acid | | 27-47% |
| Stearic Acid | | 5-15% |
| Solid Fat Content | N10 | 64-84% |
| | N20 | 41-61% |
| | N30 | 14.5-34.5% |
| | N35 | 8-18% |
| | N40 | 0-8% |

As illustrated in Graph 1 below, a fat composition according to embodiment of the present invention has a lower content of saturated fatty acids when compared to hydrogenated palm kernel oil as the lipid base. For example, in one embodiment the content of saturated fatty acids in the fat composition is 31% less than the saturated fatty acid content of hydrogenated palm kernel oil. As illustrated in Graph 1, in one embodiment, the fat composition has a saturated fatty acid content of 67% (SAFAS), a monounsaturated fatty acid content of 27% (MUFAS), less than 6% content of polyunsaturated fatty acids (PUFAS), and less than 1% of trans fatty acid content (TRANS). In comparison, hydrogenated palm kernel oil has more than 97% saturated fatty acid content. Accordingly, the fat composition results in a lower content of saturated fatty acids in the food product when compared to food products using hydrogenated palm kernel oil as the lipid base.

In some embodiments of the present invention, the interesterified base oils are prepared as follows: first, a mixture of the component oils is prepared; then the component oil mixture is interesterified, and finally, the interesterified oil mixture is refined. In another example, the component oil mixture is hydrogenated before interesterification. For example, in one embodiment of the invention the first and second interesterified base oils were prepared as described in Table 4.

TABLE 4

| Base Oil Preparation | Process Stage |
| --- | --- |
| interesterified base #1 | 1. Mix component oils<br>2. Interesterify the mixture of component oils<br>3. Physical refinement of the interesterified mixture |
| interesterified base #2 | 1. Mix component oils<br>2. Hydrogenate the mixture of component oils<br>3. Interesterify the hydrogenated mixture<br>4. Physical refinement of the interesterified mixture |

Example 1—Whipped Food Product Test Method

The fat composition of the present invention may be used as a lipid base for various food products. In one embodiment, the fat composition may be used as a lipid base for a non-dairy whipping food product with an increased "over run" characteristic. As illustrated in Table 6 below, "over run" is a calculation of a change in a density of the non-dairy whipping food product before and after whipping.

In Example 1, two non-dairy whipping food products were prepared using a fat composition according to an embodiment of the present invention as the lipid base and using hydrogenated palm kernel oil ("HPKO") as the lipid base. Table 5 illustrates the composition of the non-dairy whipping food products prepared for Example 1 based on a total weight of each non-dairy whipping food product.

TABLE 5

| Non-Dairy Whipping Food Product Composition | % |
| --- | --- |
| Water | 64.355% |
| Lipid Base | 20.000% |
| High Fructose Syrup | 15.000% |
| Lecithin | 0.200% |
| Salt | 0.100% |
| Polysorbate 60 | 0.090 |
| Sorbitan Monostearate | 0.060 |
| Lactose | 0.050 |
| Glyceryl Monostearate | 0.040 |
| Xanthan | 0.035 |
| Tween 80 | 0.030 |
| Carob | 0.015 |
| Guar gum | 0.010 |
| Carrageenan | 0.010 |
| CMC (Carboxy methyl cellulose) | 0.005 |

In one embodiment, the non-dairy whipping food products of Example 1 were prepared as follows: the water-soluble ingredients were weighted and mixed. The lipid-soluble ingredients were separately weighed and mixed with the lipid base. The water was then heated to about 70° Celsius and the water-soluble ingredients were added and incorporated into the water. After incorporation, the lipid base containing the lipid-soluble ingredients was added to the water containing the water-soluble ingredients and mixed while maintaining a temperature between 70°-77° Celsius before homogenization in a single-pass Gaulin homogenizer at a pressure between 1800-2000 psi. The homogenized mixture was then allowed to cool to ambient temperature before being refrigerated. In one embodiment of the present invention, the refrigerated non-dairy whipping food products were refrigerated for no less than 24 hours before their application.

Various methods can be used to evaluate the increase in "over run" under embodiments of the present invention. For example, Example 1 uses a "Whipped Food Product Test Method" that can be used to test whether a composition meets the Whipped Food Product Test Method in the claimed invention.

In one embodiment, the non-dairy whipping food products of Example 1 were tested under the Whipped Food Product Test Method as follows: each non-dairy whipping food product was homogenized without whipping. After homogenization, an initial density of the non-dairy whipping food product was calculated by weighing the non-dairy whipping food products in containers of known volume and weight. The non-dairy whipping food products in the containers were then placed in the mixing bowls of a KithenAid® Classic Mixer and whipped using the globe whisk attachment at a speed level 5. The non-dairy whipping food products were then mixed until the formation of peaks in the non-dairy whipped food product that stand up straight without folding over. For Example 1, the non-dairy whipping food product prepared with the fat composition as the lipid base was mixed for 7 minutes. The non-dairy whipping food product prepared using HPKO as the lipid base was mixed for 9 minutes. A final density of the non-dairy whipping food products was calculated by weighing the non-dairy whipping food products in containers of known volume and weight.

For Example 1, the initial temperature of both non-dairy whipping food products was 6° Celsius when the Initial Density (Di) was measured, and the final temperature of both non-dairy whipping food products was 13° Celsius when the Final Density (Df) was measured.

In one embodiment of the invention, the "over run" characteristic of the non-dairy whipping food products in Example 1 were evaluated as illustrated in Table 6.

TABLE 6

| Over run for Non-Dairy Whipping Food Product using HPKO as Lipid Base | |
| --- | --- |
| Initial Density (Di) | 1.06 g/cm$^3$ |
| Final Density (Df) | 0.34 g/cm$^3$ |
| Over Run (%) = ((Di − Df)*100 )/Df | |
| HPKO Over Run | 211.76% |

| Over run for Non-Dairy Whipping Food Product using Fat Composition as Lipid Base | |
| --- | --- |
| Initial Density (Di) | 1.04 g/cm$^3$ |
| Final Density (Df) | 0.31 g/cm$^3$ |
| Over Run (%) = ((Di − Df)*1.00)/Df | |
| Fat Composition Over Run | 235.48% |

As illustrated in Table 7, the change in over run between the non-dairy whipping food products of Example 1 was calculated as follows: Change in Over Run (%)=((Fat Composition Over Run−HPKO Over Run)*100/HPKO Over Run.

TABLE 7

Change in Over Run

| | |
|---|---|
| HPKO Over Run | 211.76% |
| Fat Composition Over Run | 235.48% |
| Change in Over Run = ((Fat Composition Over Run − HPKO Over Run)*100)/HPKO Over Run | Change in Over Run = ((235.48%) − 211.76%)*100)/ 211.76% |
| Change in Over Run | 11.20% | illustrates when a fat composition according to embodiment of the present invention is used as the lipid base of a non-dairy whipping food product, such as in Example 1, the whipping food product displayed 11.20% increase in "over-run" when compared to a non-dairy whipping food product using hydrogenated palm kernel oil as the lipid base. The whipping food product using the fat composition displayed a smooth, opaque, and firm appearance, with an ease of application during filling applications. In another embodiment of the invention, a whipping food product using a fat composition according to an embodiment of the present invention as the lipid base had up to a 17% increase in over run when compared to a whipping food product using HPKO as the lipid base. In another embodiment, a whipping food product using a fat composition according to embodiments of the present invention as the lipid base had up to a 19.20% increase in over run when compared to a whipping food product using HPKO as the lipid base.

Example 2—Bread/Cake Test Method

In another embodiment, a fat composition according to an embodiment of the present invention may be used to prepare a syrup used in the preparation of food products, such as bread and cakes. For example, a "tres leches" syrup. As illustrated in Table 9 below, retention within the food product of the syrup prepared with the fat composition increases when compared with retention of a syrup prepared with a hydrogenated vegetable oil, such as hydrogenated coconut or palm kernel oil.

In Example 2, two "tres leches" syrups were prepared using a fat composition according to an embodiment of the present invention as the lipid base and using hydrogenated palm kernel oil ("HPKO") as the lipid base. Table 8 illustrates the composition of the syrups prepared for Example 2 based on a total weight of each syrup.

TABLE 8

| Syrup Composition | % |
|---|---|
| Water | 64.297 |
| Sugar | 18.000 |
| Lipid Base | 9.500 |
| LDP (non-fat dry milk powder) | 3.000 |
| Dextrose | 3.000 |
| Whey Powder | 2.000 |
| Glyceryl Monostearate | 0.070 |
| Salt | 0.050 |
| Disodium Phosphate | 0.030 |
| Carrageenan | 0.020 |
| Sodium Pyrophosphate | 0.020 |

TABLE 8-continued

| Syrup Composition | % |
|---|---|
| Sorbitan Monostearate | 0.010 |
| Potassium Sorbate | 0.003 |

In one embodiment, the syrups of Example 2 were prepared as follows: the water-soluble ingredients were weighted and mixed. The lipid-soluble ingredients were separately weighed and mixed with the lipid base. The water was then heated to about 70° and the water-soluble ingredients were added and incorporated into the water. After incorporation, the lipid base containing the lipid-soluble ingredients was added to the water containing the water-soluble ingredients and mixed while maintaining a temperature between 70°-77° Celsius before homogenization in a single-pass Gaulin homogenizer at a pressure between 1800-2000 psi. The homogenized mixture is then allowed to cool to ambient temperature before being refrigerated. In one embodiment of the present invention, the refrigerated syrups were refrigerated for no less than 24 hours before their application.

Various methods can be used to evaluate the retention of the syrups in a food product. For example, Example 2 uses a "Bread/Cake Test Method" that can be used to test whether a composition meets the Bread/Cake Test Method in the claimed invention.

In one embodiment, the syrups of Example 2 were tested using a vanilla sponge cake sample under the Bread/Cake Test Method as follows: a sample of the vanilla sponge cake crust was selected and weighed. A quantity of the syrup was added to a container in an amount equal to 150% of the weight of the sponge cake crust. The syrup was previously unfrozen and refrigerated and then tested at a temperature between 7-8° Celsius. The sponge cake crust was then placed in the container and submerged in the syrup for 2 minutes. The sponge cake crust was then turn over, such that the syrup descended with gravity and placed on a plate. The amount of unabsorbed syrup was then measured and added to the amount of syrup released by the sponge cake crust at 24 and 48 hours, while maintaining the sponge cake crust at a temperature between 0°-7° Celsius. The retention characteristics of both syrups in the food products were evaluated as illustrated in Table 9.

TABLE 9

| Retention characteristics of Syrup with HPKO as Lipid Base | |
|---|---|
| Initial Sponge Cake Crust Weight (a) | 128 g |
| Weight of Syrup (b) | 192 g |
| Weight of Unabsorbed Syrup (c) | 33 g |
| % of Retained Syrup = ((b-c) * 100)/b | |
| % of Retained Syrup | 82.81% |

| Retention characteristics of Syrup with Fat Composition as Lipid Base | |
|---|---|
| Initial Sponge Cake Crust Weight (a) | 127 g |
| Weight of Syrup(b) | 190.5 g |
| Weight of Unabsorbed Syrup (c) | 19 g |
| % of Retained Syrup = ((b − c)*100)/b | |
| % of Retained Syrup | 90.02% |

In one embodiment of the invention, the vanilla sponge cake sample used for Example 2 was prepared using the ingredients listed in Table 10 as follows: A baking over was preheated to 180° C./350° F. The egg yolks were placed in a KitchenAid® mixer and mixed at high speed with a whisk attachment until creamy. After about 1 minute, 2 Tsp. of sugar was added, and the mixture was mixed until it became thicker and doubled in volume. Separately, the egg whites were placed in a KitchenAid® mixer and mixed with a whisk attachment until they are white and frothy. The sugar was then added gradually, and the mixture was mixed until the mixture clung to the whisk attachment without dripping. The egg yolk mixture was then added to the egg white mixture and folded with a spatula. The flour was sifted, and then the flour and the baking soda were slowly folded into the egg mixture to create a batter. The melted butter was then added to the batter and transferred to a lined baking pan. The lined baking pan was placed in the pre-heated oven and baked at 180° C./350° F. for 30 minutes. After 30 minutes a wood skewer was inserted into the batter to test for doneness. After the skewer came out free of batter, the pan was removed from the oven and allowed to cool. Once cooled, the cooked sponged cake was removed from the pan.

TABLE 10

| Sponge Cake Ingredients | Amount |
| --- | --- |
| Egg Whites | 8 |
| Egg Yolks | 8 |
| Sugar | 200 g |
| Flour | 200 g |
| Melted Butter | 100 g |
| Baking Powder | 1 Tsp |

Table 11 illustrates a change in the retention characteristic of the syrups of Example 2.

TABLE 11

| Change in Retention | |
| --- | --- |
| Retained Syrup using HPKO (R1) | 82.81% |
| Retained Syrup using Fat Composition (R2) | 90.02% |
| Change in Retention = ((R1 − R2)*100)/R1 | Change in Retention = ((90.02% − 82.81%)*100)/82.81% |
| Change in Retention | 8.71 |

As illustrated in Table 11, when a fat composition according to embodiment of the present invention is used as the lipid base for a syrup, such as in Example 2, the retention in a food product of the syrup increased by 8.71% when compared to the retention in a food product of a syrup using hydrogenated palm kernel oil as the lipid base.

In other embodiments, the fat composition may be used in the preparation of custards and gelatins. For example, when a fat composition according to embodiment of the present invention is used to produce a gelatin, the gelatin displayed a smooth and firm texture. Similarly, in another embodiment, when a syrup comprising the fat composition was mixed with egg to create a custard, the custard displayed a smooth and firm texture after being baked or steamed.

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A fat composition consisting of:
a first refined and interesterified oil mixture;
wherein the first refined and interesterified oil mixture consists of at least one of:
a. palm oil,
b. palm kernel oil,
c. palm oil fraction, or
d. coconut oil; and
a second refined and interesterified oil mixture,
wherein the second refined and interesterified oil mixture consists of at least two of:
a. hydrogenated palm oil,
b. hydrogenated palm kernel oil,
c. hydrogenated palm oil fractions, or
d. hydrogenated coconut oil,
wherein a total amount of saturated fatty acids is between 62% and 72% based on the total fatty acid content of the fat composition, and
wherein a weight ratio between the first refined and interesterified oil mixture and the second refined and interesterified oil mixture is between 2 and 9.

2. The fat composition of claim 1, wherein a total trans fatty acid content is less than 1%, based on the total fatty acid content of the fat composition.

3. The fat composition of claim 2, wherein, when the fat composition is tested as a lipid base used to prepare a whipped food product in accordance to the Whipped Food Product Test Method, an over run characteristic of the whipped food product is at least 8% more than when a whipped food product is prepared with hydrogenated palm kernel oil as lipid base alone in accordance to the Whipped Food Product Test Method.

4. The fat composition of claim 3, wherein the ratio of the first refined and interesterified oil mixture to the second refined and interesterified oil mixture in the fat composition is determined by an increase from 8% to 30% in over-run when the fat composition is tested in accordance to the Whipped Food Product Test Method.

5. The fat composition of claim 2, wherein, when the fat composition is tested as a lipid base used to prepare a syrup in accordance to the Bread/Cake Test Method, a retention of the syrup in a food product is at least 5% more than the retention of a syrup in a food product when a syrup is prepared with hydrogenated palm kernel oil as the lipid base in accordance to the Bread/Cake Test Method.

6. The fat composition of claim 5, wherein, when the fat composition is tested as a lipid base used to prepare a whipped food product in accordance to the Whipped Food Product Test Method, the ratio of the first refined and interesterified oil mixture to the second refined and interesterified oil mixture in the fat composition is determined by an increase from 5% to 15% in the retention of the syrup when the fat composition is tested in accordance to the Bread/Cake Test Method.

7. The fat composition of claim 1, wherein:
based on a total fatty acid content of the first refined and interesterified oil mixture, the first refined and interesterified oil mixture comprises:
between 4% and 18% of lauric acid,
between 1% and 6% of miristic acid,
between 32% and 50% of palmitic acid, and
between 3% and 8% of stearic acid;
based on a total fatty acid content of the second refined and interesterified oil mixture, the second refined and interesterified oil mixture comprises:
between 18% and 35% of lauric acid, between 6% and 14% of miristic acid,
between 15% and 26% of palmitic acid,
between 26% and 40% of stearic acid; and the fat composition comprises:
between 70% and 90% of the first refined and interesterified oil mixture oil, and
between 10% and 30% of the second refined and interesterified oil mixture, based on a total weight of the fat composition.

* * * * *